(12) United States Patent
Meron

(10) Patent No.: US 9,995,650 B2
(45) Date of Patent: Jun. 12, 2018

(54) TRANSMISSION TEST RIG COMPRISING BELT DRIVES

(71) Applicants: Dan Meron, Moshav Beit-Elazari (IL); Decagon Projects Ltd., Moshav Beit-Elazari (IL)

(72) Inventor: Dan Meron, Moshav Beit-Elazari (IL)

(73) Assignees: Dan Meron, Moshav Beit-Elazari (IL); Decagon Projects Ltd., Moshav Beit-Elazari (IL)

( * ) Notice: Subject to any disclaimer, the term of this patent is extended or adjusted under 35 U.S.C. 154(b) by 0 days. days.

(21) Appl. No.: 15/127,862

(22) PCT Filed: Dec. 24, 2015

(86) PCT No.: PCT/IL2015/000054
§ 371 (c)(1),
(2) Date: Sep. 21, 2016

(87) PCT Pub. No.: WO2016/108218
PCT Pub. Date: Jul. 7, 2016

(65) Prior Publication Data
US 2017/0227419 A1 Aug. 10, 2017

Related U.S. Application Data

(60) Provisional application No. 62/097,133, filed on Dec. 29, 2014.

(51) Int. Cl.
*G01M 13/02* (2006.01)
(52) U.S. Cl.
CPC .................. *G01M 13/026* (2013.01)
(58) Field of Classification Search
USPC ....................................................... 73/115.02
See application file for complete search history.

(56) References Cited

U.S. PATENT DOCUMENTS 3,060,730 A 10/1962 Lucia
4,615,212 A 10/1986 Kugler et al.
(Continued)

FOREIGN PATENT DOCUMENTS

WO WO 2016/108218 7/2016

OTHER PUBLICATIONS

International Preliminary Report on Patentability dated Jul. 13, 2017 From the International Bureau of WIPO Re. Application No. PCT/IL2015/000054. (6 Pages).

(Continued)

*Primary Examiner* — Eric S McCall

(57) ABSTRACT

A test rig of the closed loop type for testing power transmission units of any geometry, in particular helicopter transmissions, comprising drives with friction belts, flat belts in particular. The belt drives have pulleys with diameters that compensate for the creep in the belts. In some embodiments, the test rig comprises 'slave' transmissions. In some embodiments the slave transmission is positioned and oriented in such a manner that all its input and output shafts, regardless their different space angles, become parallel and rotating in the same direction as their corresponding shafts on the tested transmission. The shafts can thus be connected by the flat belt drives to close the loops. In other embodiments, sets of gearboxes are run with their slave units; their orientation is also set so as to enable the parallelism and identity of the rotational direction of the shafts the belt drives are connected to. Still, in other embodiments, the close loops are implemented by belt drives only, including belt drives with twisted belts. Torquing the loops is accomplished either by tensioning the belts during operation or by a torque generator device.

24 Claims, 7 Drawing Sheets

(56) References Cited

U.S. PATENT DOCUMENTS

| | | | | |
|---|---|---|---|---|
| 4,732,036 A * | 3/1988 | Weeder | ............... | G01M 13/025 73/115.02 |
| 5,537,865 A * | 7/1996 | Shultz | ................ | G01M 13/025 73/115.02 |
| 5,693,896 A * | 12/1997 | Mistral | ............... | G01M 99/004 73/178 H |
| 6,047,596 A * | 4/2000 | Krug | ................... | G01M 13/026 73/162 |
| 6,393,904 B1 | 5/2002 | Krug et al. | | |
| 6,820,472 B2 * | 11/2004 | Ranchin | ............. | G01M 13/025 73/115.02 |
| 8,758,184 B2 * | 6/2014 | Blankenship | ........... | F16D 11/14 475/269 |
| 2003/0079531 A1 | 5/2003 | Ranchin | | |
| 2003/0107384 A1 * | 6/2003 | Ranchin | ............. | G01M 13/025 324/555 |
| 2012/0046141 A1 | 2/2012 | Blankenship et al. | | |

OTHER PUBLICATIONS

International Search Report and the Written Opinion dated Apr. 19, 2016 From the International Searching Authority Re. Application No. PCT/IL2015/000054.

\* cited by examiner

TRANSMISSION TEST RIG COMPRISING BELT DRIVES

RELATED APPLICATIONS

This application is a National Phase of PCT Patent Application No. PCT/IL2015/000054 having International filing date of Dec. 24, 2015, which claims the benefit of priority under 35 USC § 119(e) of U.S. Provisional Patent Application No. 62/097,133 filed on Dec. 29, 2014. The contents of the above applications are all incorporated by reference as if fully set forth herein in their entirety.

FIELD OF INVENTION

This invention relates to rigs for running and testing power transmission units by the method of closed mechanical loops.

BACKGROUND ART

Testing gearboxes and transmissions in a destined test rig—named also test stand or test bench—is usually the final procedure in overhaul or other maintenance operations. For aircraft transmissions, this so called acceptance test is mandatory. The test run procedures usually require subjecting the transmission to full power, meaning applying simultaneously the full torque and full speed that simulate the extreme load in service. Most high power transmissions are tested in closed loop test rigs in which the power from the output shaft is not wasted in a dynamometer or brake but routed back through various drives to the input shafts as in U.S. Pat. No. 4,615,212, while a 'torque generator' creates a twist in the loop which yields the torque. In general, a closed loop consist of a drive train that may include any kind of drives such as gearboxes, chain drives or hydrostatic drives and may include even nonmechanical drives such as electrical motors and generators. Turning the closed loop requires only the power wasted by friction in the system which is a small percentage of the power passing through the tested transmission and drives.

One type of torque generator is of the planetary or epicyclic type such as displayed in U.S. Pat. No. 2,981,103 and in U.S. Pat. No. 4,711,124. To apply it, the overall gearing reduction ratio in the loop including the planetary gearbox is set to unity, such that when starting to count from any point and tracing along the loop back to that point, the overall gearing ratio is 1:1. In this way, applying stationary torque to the case of the planetary gearbox induces torque in the loop. Another type of torque generator that may be inserted in the loop is a clutch, hydraulic or electrical as disclosed in U.S. Pat. No. 4,274,278. The overall reduction ratio in the loop is set to a value close to unity; the amount of difference from unity determines the percentage of slippage and energy loss in the clutch.

The drives that are used to close the loops are usually gearboxes. Using an identical 'slave' gearbox to the one being tested is the common way to achieve the gearing ratio of 1:1 in the loop. The slave transmission runs either in a reverse torque mode or in a reverse rotation direction mode relative to the tested one. The geometry of the gearbox is of great significance in this situation. When the input and output shafts of the gearbox are parallel to each other, the tested and slave gearboxes can be connected directly as disclosed in U.S. Pat. No. 3,078,711. For a transmission having the input shaft at right angle with the output shaft, the loop is usually closed in a square formation with one slave and two additional right angle gearboxes, or two additional slave transmissions.

For gearboxes with complex geometry, that is, having input and output shafts positioned, oriented at odd angles and turning in different directions, such as in many main helicopter transmissions, special matching gearboxes need to be constructed to close the loop. These specially designed gearboxes manufactured as one-off items are very expensive to build, in particular for aircraft transmission testing rigs. Few companies have the capability and experience to build gearboxes with spiral bevel gears of any shaft angle that run at speeds up to or above 20,000 rpm or gears for torques over 6000 kg-m that transmit thousands of horsepower. The test rigs of these transmissions as disclosed in U.S. Pat. No. 6,047,596 are also very large and massive relative to the tested transmission. An alternative method is using an electrical test rig as demonstrated in U.S. Pat. No. 8,758,184, where huge electrical motors and generators are used to close the power loop. These test rigs also use custom-built transmissions and are even more massive and expensive than their mechanical counterparts, but can be adopted more easily to run different kinds of transmissions.

SUMMARY OF THE INVENTION

One scope of the present invention is to simplify and drastically reduce the construction costs of closed loop rigs for testing complex gearboxes, mainly helicopter transmissions, by substituting gear drives with friction belt drives such as flat belt drives. The term 'complex gearboxes' refers herein to gearboxes or transmissions that may have more than one input and one output shaft, these shafts may be oriented and positioned at any geometry relative one to the other and may run in any direction. To effectively test the transmission, the rig may, and should be rotated at very high speeds and may and should be subjected to very high torques to stress the transmission to at least its normal operation conditions or beyond. Running of transmissions in test stands or rigs is done mainly for testing the transmission themselves' though the present invention is not restricted to this scope and can be implemented for any other purposes, for example research of qualities of gears, bearings or oils for such transmissions.

The notion of 'friction belt' used herein is referring to belts such as V or flat belts that transmit the torque by friction in contrast to timing belts or chain belts for example. In the following text, the term belt drive will hence always refer only to a friction belt drive. A basic characteristic of a friction belt is that it creates an effect of slippage in the drive. Given a drive constructed of a belt and two pulleys that are equal in diameter, the driven pulley will turn a little bit slower than the driving one when the drive is transmitting torque. This effect is actually not caused by slippage of the belt over one or both pulleys, but by creep. Creep is the trait of a belt to stretch more under the higher pulling tension on one side of the drive, and stretch less under the lower pulling tension on other side of the drive. It is the difference in tension in the belt when moving from one side of the pulley to the other side of the pulley that creates the torque. In contrast, slippage can be defined as dragging the belt over the pulley.

A belt drive is a simple mechanical element composed of at least one belt and two or more pulleys rolling over headstocks mounted on a construction having a tensioning member between them. Its construction poses no risk in development and its maintenance is also very easy. Its cost is extremely low compared to a gearbox and in particular a high speed, high torque specially manufactured custom made gearbox. Another advantage of a belt drive regarding transmission test rigs is its flexibility. A rig incorporating belt drives can tolerate deformations created by the torques in the loops without having to construct compensating systems. The deformations can be absorbed in the belt drives, for example by twisting the drive, i.e. tilting slightly the pulleys from their parallel position or by slightly shifting them axially.

Common practice however, dictates that belt drives are inappropriate for usage in running high power, high-speed helicopter transmissions for obvious reasons.

First, as noted above, these transmissions have usually a complex geometry while belt drives generally transmit power between parallel shafts turning in the same direction.

Second, unlike gearboxes, V and flat belts creep under operation which means they create a slippage effect which increases with increasing torque. Therefore, most of the conventional torque generators are not applicable.

Last, the torques and the speeds and transmitted power of common belt drives are generally far below the range of these values used in helicopter transmissions.

It is one objective of the present invention to presents a systems and methods that overcome these limitations based on at least some of the following principles:

1) Solving the geometry problem by at least one of two methods:

a) Using a slave transmissions, identical or similar to the tested transmission, then fixing the slave transmissions and the tested transmission in a position and orientation relative to each other such that all their shafts become either aligned or substantially parallel to each other and preferably turn in the same direction. Embodiments of the invention disclosed herein demonstrate that this is possible even for transmissions with complex geometry. Then, closing the loops by connecting belt drives between the corresponding tested and slave transmissions' shafts. The term 'similar' is used herein for a slave transmission having shafts oriented as in the tested transmission but that may have different speeds or gear ratios. Certain types of belt drives loops can run on non-parallel shafts, enabling loops to be closed with slave transmissions which are not similar. 'Half-cross' drives can connect perpendicular shafts and 'mule' drives can connect shafts oriented at any angle. Parallel shafts turning in opposite directions may be connected with 180° twisted flat belts.

b) Run the tested transmissions only by belt drives, with non-parallel pulleys having twisted belts. These drives can also compensate for the gear ratio of the transmissions by pulleys of different diameters.

2) Solving the difficulty of using flat belts at high torque and high-speed conditions. Practical testing has shown that by using wide, endless, lightweight aramid fibers flat belts on pulleys with diameters relatively small to the transferred torque, thousands of horsepower with speeds over 10,000 RPM can be transmitted by one drive. These values are far over the nominal power and speed ratings of regular belt drives. Non-parallel drives can be constructed as well, taking advantage of the ability of the belts to twist between skewed pulleys due to their elasticity.

3) Solving the creepage problem of the belts by producing a designed slippage and creep in the loop using intentional difference between the diameters of the pulleys in each drive, and by either combining a tensioning mechanism in the belt drive which can be operated during operation or by inserting a torque generator in the loop. It comes out that in the tensioning of the belts method, the belt works well despite the fact that slippage is present in addition to the normal creep and that in the torque generator method, the designed slippage is automatically divided between the belt and the clutch so that the torque can be fully controlled by the clutch.

Each of the above principles is detailed in the following.

The Geometrical Arrangement:

A main helicopter transmission is given herein as an example for the description of running a complex gearbox in a loop with slave gearboxes because it represents the most complicated application. A test rig capable of handling thousands of horsepower for such a transmission including the nose gearboxes has been built successfully and the experience and knowledge acquired are expressed in the following text. The term 'transmission' is generally used here for a complex gearbox usually having additional devices except of the gear trains and other supporting elements such as bearings. Within the scope of this text, the difference between a transmission and a gearbox is insignificant and both terms will henceforward be used as the units are conventionally named in the industry. Such a main helicopter transmission has one or more input shafts depending on the number of the driving engines, an output shaft called 'mast' driving the main rotor and a secondary output shaft driving the tail rotor. Main helicopter transmissions have additional other minor input and output shafts which are not usually required to be loaded in the test rig by the acceptance test procedure, but if required, loops with drive belts can be similarly build to load them. An example for such optional minor input and outputs are connection to the EPU (emergency power unit), outputs are for two main hydraulic pumps and two generators.

To construct the right geometry, the masts of the tested and slave transmissions are aligned, parallel or concentric and joined by a connecting drive of any kind such as a coupling, clutch, gearbox, chain or belt drive. As long as no other connections have already been made, the decision of what shaft to be coupled with the corresponding slave shaft is a matter of choice. This shaft is henceforward called 'aligned shaft'. The mast is chosen in the exemplary embodiments disclosed herein as the aligned shaft because it transmits very high torque, so any other driving mechanism except a direct coupling between the mast of the tested transmission and the mast of the slave one, would be much larger, complicated and expensive.

If the tested transmission is positioned as it is normally positioned on the aircraft, that is, with its mast oriented upright, the alignment of the masts can be done in two ways:

One way is placing the slave transmission upside down over the tested transmission, this configuration called henceforward 'top to top'.

The other way is placing the slave transmission over the tested one without turning it over, with its mast also oriented upright, this configuration called henceforward 'top to bottom'. A connecting shaft that passes through the bottom of the slave transmission has to be constructed for this last configuration, a feasible possibility for many helicopter main transmissions as their cases contain removable sump caps and their masts are hollowed. According to some exemplary embodiments, the upper part of the mast is extended, large in diameter and have a big spline designed to transfer the torque to the main rotor. For this reason, there is a risk that if a connection is made to the weak bottom side of the mast, the torque would shear it. Thus, the connecting shaft is preferably coupled to the top side of the slave transmission's mast or the original mast is replaced with a special manufactured slave mast.

In the 'top to top' configuration, the slave transmission shafts turn in reverse direction relative to the normal operation of the tested transmission, while in the 'top to bottom' configuration the torque is in the opposite direction relative to the normal operation of the tested transmission. For gearboxes other than main helicopter transmissions, the terms 'top to top' or 'top to bottom' can be used with the meaning of pointing the aligned shafts with their ends 'front to front' or 'front to back' respectively, regardless of the spatial orientation of the shafts relative to earth.

The terms of direction regarding turning and torque need clarification. The direction of turning depends on the position of the viewer. For a gearbox, the direction of turning clockwise or counterclockwise is determined from a pre-accepted view relative to the shaft in question, for example looking at the free end of the shaft toward the gearbox. When comparing the direction of turning of two parallel shafts in a group of transmissions or gearboxes placed and oriented in a specific way, the comparison is made by looking in the same direction relative to the group toward both shafts. Thus in the 'top to top' configuration, if a shaft of the tested transmission turns clockwise relative to that tested transmission, its corresponding shaft on the slave transmission turns then counterclockwise relative to the slave transmission. However in the rig, the tested and slave transmissions can be oriented in opposite direction such that these shafts turn in the same direction—meaning both clockwise when looking at the free end of the shaft of the tested transmission toward the tested transmission, or both counterclockwise when looking at the free end of the shaft of the slave transmission toward the slave transmission. In contrast to this situation, the direction of torque is independent of the position of the viewer. It is either right hand or left hand similar to the direction of threads on a screw.

In the 'top to bottom' configuration, by rotating the slave transmission around its mast so that its front side is oriented in the same direction the front of the tested transmission is, an orientation henceforward named 'front with front', all of the shafts of the slave transmission become aligned parallel with the corresponding shafts of the tested transmission and also turn in the same direction. The term 'corresponding shaft' stands for a shaft of the slave transmission which is the same as the one on the identical tested transmission or oriented alike for a similar slave transmission. The term 'parallel' means that the geometrical axes of these shafts are parallel.

In the 'top to top' configuration, aligning in parallel the shafts of the slave transmission with those of the tested one is not always possible, and depends on the geometry of the transmission. In the following cases the possibility of parallel alignment exists:

1) The first case. To explain this case, an example is taken, starting with a test gearbox and an identical slave gearbox, each having one input shaft and one output shaft that is oriented at any angle or offset relative to the input shaft. The output shaft of the test gearbox is oriented upright. After the output shafts are aligned concentric in a 'top to top' configuration, the gearboxes are rotated around their output shafts until their input shafts are aligned parallel to each other, and directed at 180° one relative to the other. This is always possible, and in this case input shafts will also be turning in the same direction when the output shafts turn in the same direction as since they are directly connected. At this 180° orientation, henceforward named 'front with back', the input shafts are oriented in a common plane which is parallel to the output shafts' axis and offset to it by the amount the input shafts are offset to the output shafts. Then, any additional shaft the test gearbox may have, if its axis lies in a plane which is parallel to that plane, it will be parallel to its corresponding shaft on the slave gearbox, indifferent of its angle or offset to the other shafts. All this is true in the case the input shafts are set aligned instead of the output ones.

2) The second case. When the transmission has two shafts that are positioned symmetrically such that their orientations are mirrored relative to a plane which includes the aligned shaft. The orientation of the transmissions in this case is also 'front with back' when the 'front' is perpendicular to the symmetry plane. Though, the shafts that become parallel in this configuration are not the corresponding ones but the symmetrical ones, meaning a shaft of the slave transmission is parallel to the shaft which is the symmetric shaft of its corresponding shaft of the tested transmission. When the aligned shafts are directly connected or turn in the same direction, a connection between these non-corresponding shafts is possible by untwisted belt drives if the symmetrical shafts turn in the same direction and have the same rotational speed. This condition is normally fulfilled by helicopter transmissions which are driven by two identical engines. When the transmission has additional shafts which lie in planes that are parallel to the symmetry plane, then like in case 1 above, these shafts are parallel and turning in the same direction as their corresponding ones on the slave transmission.

3) Third case. When a transmission in one of the two cases listed above has additional shafts which are perpendicular to the parallel plane or to the symmetrical plane. These shafts, in this 'front with back' orientation, are then also parallel and turning in the same direction as their corresponding ones on the slave transmission.

Apart from these cases, it is possible to run any kind of transmission in the 'top to top' configuration with belt drives even when the corresponding shafts of the tested and slave transmission are not parallel, by producing parallel shafts with the help of one or two additional gearboxes. These gearboxes, having one input and one output shaft may be off the shelf gearboxes, as there are no restrictions regarding their geometry, namely the angle or offset between their shafts, or their reduction ratio. In the case of the main helicopter transmission, this configuration is of particular importance when the transmission is to be tested together with the nose gearboxes. Then, to each nose gearbox a slave nose gearbox is attached and the pair is placed and oriented so as to produce two parallel shafts for closing the loop with a belt drive even when the position of the corresponding input shafts on the tested and slave main transmissions is not parallel. The same can be done when the main transmission is to be tested with the intermediate or tail rotor gearbox in case the tail rotor shafts of the tested and slave transmissions cannot be bought to be parallel. It is to be noted that in all these cases, only the shafts to which the belt drives are to be connected are bought parallel and rotating in the same direction. In the other pairs of tested and slave gearboxes, such as the nose ones above, this condition is not fulfilled.

Other method of building a loading loop is by belt drives alone, taking advantage of two of characteristics of belt drives. One characteristic is the fact that different transmitting ratios can be attained by belt drives through their pulleys' diameters. The second characteristic is the ability of the belts to twist between skewed pulleys due to their elasticity. By utilizing these qualities, belt drive loops can be constructed to run any complex gearbox or a set of gearboxes in a closed loop.

Drives with twisted belts are usually one of two kinds. The first kind is dubbed 'mule', transfers the power between two pulleys having intersecting axes at an angle. This drive makes use of additional guiding pulleys. The second kind transfers power between two pulleys having parallel shafts and turning in opposite direction, the belt forming an 8 shape. The last kind of drive can be replaced by a multiple pulleys drive and a flat belt which can transfer the power on both of its sides. All of these drives can work between pulleys of different diameters, enabling them to compensate for the gearing ratio of the tested transmission.

The Connection and Construction of the Belt Drives:

Main helicopter transmissions input shafts are driven by the engines through a gearbox usually named nose gearbox that reduces the rotational speed of the turboshaft engine of around 20,000 RPM to at least a half. In the past, these gearboxes used to be part of the engine, nowadays they are commonly independent units and sometimes part of the main transmission. This rotational speed of the turboshaft engines and correspondingly of the input shafts of the nose gearboxes may be too high to be driven by belt drives. This problem may be overcome by connecting directly these shafts to their corresponding input shafts of the nose slave gearboxes. The belt drives can be connected to the nose gearboxes' output shafts that run, as said, at about half of the engine speed.

There are cases in which the main transmission comprises the nose gearbox, that is, the nose gearbox constitutes a part or module of the main transmission so that its output shaft is inaccessible. To overcome this problem, these modules of the slave main transmission may be detached from that slave main transmission such as to enable the belt drives an access to their output shafts. Through these methods, test rigs can be constructed to run the main transmission together with the nose gearbox or gearboxes and/or with other units such as the intermediate or tail rotor gearboxes or alternatively to run each gearbox alone, all a matter of choice.

Nose gearboxes, intermediate and tail rotor gearboxes can also be run apart or together in a separate test rig with belt drives, either with or without slave gearboxes.

The design of the belt drive is a major key to the possible implementation of the present invention. As regard to driving the input shafts of a main helicopter transmission with belt drives, only flat belts can be considered. Even so, the torques and velocities are high—up to 100 kg-m and 10,000 RPM or more—such that the centrifugal forces on the part of the belt encompassing the pulley, greatly release the grip of the belt on the pulley. Thus, only a part of the tension of the pulley can be utilized to transmit the torque. The combination of a lightweight belt—for example less than 2.5 kg/m$^2$, with a high tensioning capability—over 5 kg per mm width, is therefore critical. Endless flat belts with aramid fibers are the preferable choice. Even with these belts, and with pulleys having diameters of about 200 mm or less, the reduction of the belts' grip on the pulleys due to the centrifugal force, may be more than half compared to operation at low or medium velocities.

In an exemplary embodiment of the invention, the belt thickness is less than 2 mm. Almost all of its weight of the belt comes from the rubber which is its main component. In the belt's core are aramid cords which provides most of the tensile strength that resist the tension. The rubber creates the high friction surface. For example, a strip of belt of 1.8 mm thickness and 1 mm wide, made of over 90% rubber can be loaded by 5 kg with a safety factor greater than 2.

It should be noted that using small diameter pulleys for transmitting high power is counter intuitive as the transmitted torque decreases with decreasing the pulley's diameter. However, smaller diameter is required for decreasing the centrifugal force at high angular velocities required in these tests.

The loss in the grip must be compensated by high tensioning and wider belts. Pulleys of flat belts are crowned to keep the belt centered. This feature limits the width of the belt which can be used. One solution used in this invention is to split the belt into several bands and create a separate crowned section on the pulley for each band. Despite of their lightness and high-tension capacity, aramid fibers flat belts have some limitations. They cannot be bent under certain radius, which limits the minimum diameter of the pulleys and they are limited to medium temperatures. Since the belts heats during the demanding operation, the belt drives may be designed to have enough length to chill between the pulleys. Additionally or alternatively, other cooling methods may be used. For example providing fans to blow air over the belts, or attaching fans to the pulleys. To reduce cluttering the figures, such optional cooling systems are not seen in the figures. Aramid fiber belts have an additional advantage regarding their elongation under tension, which is very low compared to more common flat belts whose core is made of polyamide sheet or polyester cords. The elongation determines the amount of creep and accordingly the loss of energy transformed to heat during operation.

Drives with twisted belts are considered limited in the power they can transmit because their belts' width must be narrow, depending on the angle of twist. Since, the maximum angle of twist is calculated per unit of length, by increasing the distance between the pulleys, wider belts can be used. Flat belts are relatively light so they can operate at higher velocities, enabling pulleys with greater diameters which increase the torque that can be transmitted. Because these belts are relatively narrow, multiple belts can be mounted in the space of a wide untwisted belt. By applying these directives and by using high tensioning flat belts as those with aramid fibers, many hundreds of horsepower can be transmitted by a single belt drive of this kind.

Producing the Torque:

A loop of a test rig according to exemplary embodiments of the present invention comprises a gear train in the tested transmission or gearbox, an optional gear train in the slave transmission, and a drive belt.

Two methods of inducing torque in such loops are presented in the following exemplary embodiments of the current invention:

The first method comprises designing the drive belt so that the torque is being produced directly by it. The second is incorporating an additional element, a torque generator, in the loop.

The first method uses a device for tensioning the belts during operation. In the helicopter transmissions with identical slave units as described above, both pulleys of the belt drives turn at exactly the same speed dictated by the combined gear trains of the tested and slave transmissions, regardless of changes in the transmitted torques. The loop including the belt drive is designed with an overall reduction ratio slightly different from one, by creating a small difference between the diameters of the pulleys of the belt drive. Because the tangential velocity of the outer surface of the pulley with the greater diameter is greater than that of the smaller pulley, the greater pulley becomes the driving one.

As the tested transmission is preferably loaded in the same way as in the aircraft, the smaller driven pulley has to be connected to the input shaft of the tested transmission, and the driving pulley to the corresponding input shaft of the slave transmission. If the transmission has an additional output shaft to be loaded aside from the already rigidly connected one, in the case of the helicopter transmission, for example the tail rotor shaft of that transmission, then in the belt drive connecting it, the greater driving pulley is to be connected to that output shaft and the smaller driven pulley to the corresponding output shaft of the slave transmission.

Unlike regular belt drives in which the tension is preset at all times, an optional tensioning mechanism that push the pulleys apart may be constructed in this belt drive so that the tensioning mechanism may be operated while the belt drive is running, that is while the pulleys are turning. This can be done for example by an actuator such as a hydraulic cylinder or electrical actuator. When operating the loop without any load, the belt slips over the pulleys. Then, gradually tensioning the belt induces torque in the loop and the slippage progressively turns into creep. To reduce cluttering the figures, such an optional tensioning mechanism is seen in details only in FIG. 5. This mechanism of producing torque for testing a transmission in a closed loop can be implemented to any kind of transmission gearbox or mechanical drive.

There seems however to be a conceptual problem with such a simple loading mechanism design. By all directives, slippage must be prevented in belt drives: it's claimed to wear out the belts and produce high heat that rapidly degrades the belts. These general directives had prevented till now the implementation of a torquing mechanism as described above because of misinterpretation regarding their realm or misunderstanding the creepage phenomena. The directives are completely right when slippage occurs as a result of over torquing that exceeds the allowable tension up to which the belt expands by creep in linear proportion to the tension. But the mechanism described above, works because although slip and creep are created and act differently, their outcome effect of wear and heat which comes from rubbing the belt against the pulley is the same. Therefore, as long as the wear and heat do not exceed the designed limits of the belt it does not matter what source they come from. On a normally operated belt, only creep is present while in the proposed aforementioned mechanism both creep and slippage may be present. The slip and creep, produce together a fixed wear and heat while creep increases and slip accordingly decreases when raising the torque by increasing the tension. The difference in the pulleys diameters preferably have be so designed that at the maximum tension and torque, the creep in the belt does not exceed its specified limits of the belt in use, otherwise as explained the belt ruins rapidly. Theoretically, it is also possible to tension the belt to its maximum designed value and leave that tension unchanged during operation, so that the first phase of slippage or slippage and creep is omitted. This way, the maximum torque is produced in the loop as it starts to turn. Most of test run schedules however, do not allow such a manner of operation. Generally, test run schedules are designed to simulate realistic flight profile which includes varying the loading conditions.

The second method of producing torque in the loop is by adding a torque generator device. When a clutch is used as torque generator in this second method, the difference in diameter between the two pulleys is preferably larger than the difference in diameter between the two pulleys used in the first method because the difference in diameter requires to compensate for both belt's creep and slippage in the clutch. This is not a new method in test rigs, but when the torque generator, a clutch for example, produces slippage and a friction belt drive is part of the loop, the situation and operation mode are completely different. Unlike a loop closed solely by gearboxes, in a loop containing a belt drive, not only the overall reduction ratio changes when the torque is increased due to the raising creep in the belt, but there are in this case two centers of slippage, that in the torque generator and that produced by the creep effect. Here too, this situation raises a conceptual problem: if for example, two clutches are set in a loop and the first is an uncontrollable one, as is the creep in a belt, then it would be impossible to fully control the torque in the loop with the second clutch alone. This is because torque cannot be raised above the torque created by the first clutch since further engaging the second clutch will only raise the slippage in the first one. However, when the first clutch in the loop described above is replaced by a belt drive, there is no problem to control the torque to its full range with the second clutch. This is because the effect of 'raising the torque raises the creep' works in reverse too—'raising the creep raises the torque'. Thus, unlike the previous case in which the amount of slip does not affect the torque of a clutch, the engagement of the second clutch in this case raises the creep in the belt, this time causing a raise of the torque in the loop.

Two types of torque generators are presented in the following exemplary embodiments of the invention:

The first, is the simpler one, is a hydraulic operated clutch. Unlike a regular clutch that engages or disengages, this clutch may operate constantly under slippage with fine adjustment of the pressure which controls the produced torque. Usually special linings and a cooling system are required to comply with these demands. The belt drive in the loop containing the clutch is preferably built with the difference between the diameters of the pulleys as described above but its tensioning is preset and constant as in a regular belt drive. When the clutch is not engaged, the loop is disconnected and the belt rolls with the pulleys without creep or slippage. The velocity of the outer surface of the pulleys is then equal and the difference in their diameters causes a slight difference in their turning velocities. As one pulley is connected to a shaft of the tested transmission and the other to the corresponding shaft of the slave one, the identical gear trains of the transmissions transmit the turning velocities of the pulleys divided by the reduction ratio of the gear trains to the two unengaged parts of the clutch. The engagement of the clutch tries to force its two parts to reduce their slippage, that is their velocity one relative to the other, this creating a torque in the loop. The torque causes the belt that transmits it to creep, reducing the slippage in the clutch by the amount of its creepage.

The second type of torque generator is an epicyclic drive such as a planetary gearbox or a differential. It has an input member, an output member and a rotating case. Unlike the torque generators used in test rigs with fixed gear ratio loops, this planetary gearbox must have provisions to enable its case to rotate constantly to compensate for the creep in the belts. The ratio between the diameters of the pulleys of the belt drive has to match the reduction ratio between the input and output members of the planetary gearbox when its case is fixed, so that the overall reduction ratio in the loop is one or close to one. When the case of the planetary gearbox is let free to rotate, no torque is induced in the loop. The case of the planetary gearbox will remain stationary when the gearing ratio is one and turn slowly in one direction or the other, if the gearing ratio is a bit bigger or a bit smaller than one. To create a torque in the loop, the case must be either forced to rotate by a motor or impede from rotating freely by a generator or a by a brake which acts similar to the operation of the clutch described above. In this way, energy can either be added to or extracted from that torque generator. When energy is extracted, this torque generator becomes a slippage type one. The direction of the torque applied to the case sets the direction of the induced torque. The rotational speed of the case relative to its free condition sets the amount of the induced torque and it determines the amount of creep in the belt.

It is one objective of the current invention to provide a system for testing at least one test transmission comprising: at least one test transmission having at least one input shaft and at least one output shaft, said at least one input shaft being nonconcentric and nonparallel relative to said at least one output shaft; a drive train closing a mechanical loop between said at least one input shaft to said at least one output shaft; and a turning device for rotating said mechanical loop, wherein said drive train comprises at least one friction belt drive having at least one belt, the overall gearing ratio of said drive train is less than the gearing ratio between said at least one input shaft and said at least one output shaft.

In some embodiments the at least one friction belt drive further comprises a tension control device, wherein said tension control device changes the tension of said at least one belt such that the operation of said at least one belt changes from slippage to creepage during rotation of said mechanical loop, thus generating torque in the mechanical loop.

In some embodiments the drive train further comprises at least one torque generator for generating torque in said mechanical loop.

In some embodiments the at least one torque generator includes a clutch.

In some embodiments the at least one test transmission is one of: a helicopter main transmission; and a helicopter gearbox.

In some embodiments the at least one belt is a flat belt.

In some embodiments the flat belt contains aramid fibers.

In some embodiments the pulleys of said at least one friction belt drive are substantially parallel.

In some embodiments the drive train comprises at least one slave transmission, said slave transmission having at least one slave input shaft and at least one slave output shaft oriented substantially at same angles as said at least one input shaft and said at least one output shaft of said at least one test transmission; wherein said at least one slave transmission is placed in a position in which said at least one slave input shaft and said at least one slave output shaft become substantially parallel to said at least one input shaft and said at least one output shaft of said at least one test transmission and rotating in the same direction, thus enabling the connection of said at least one friction belt drive with parallel pulleys.

In some embodiments the at least one slave transmission is substantially identical to said at least one test transmission.

In some embodiments the at least one slave transmission is oriented 'top to bottom' and 'front with front' with respect to said at least one test transmission.

In some embodiments the at least one slave transmission is oriented 'top to top' and 'front with back' with respect to said at least one test transmission.

In some embodiments the at least one of said at least one slave input shaft and said at least one slave output shaft comprises a module detached from said at least one slave transmission, wherein at least one of said at least one friction belt drive is connected between said module and said at least one slave transmission.

In some embodiments the drive train comprises at least one slave transmission and at least one gearbox having at least one gearbox input shaft, and at least one gearbox output shaft nonparallel to said at least one gearbox input shaft, wherein said at least one gearbox enables closing said mechanical loop by said at least one friction belt drive with parallel pulleys where the input and output shafts of said at least one slave transmission are not positioned parallel to at least one of said at least one input shaft and said at least one output shaft of said at least one test transmission.

In some embodiments the at least one belt is twisted between nonparallel pulleys.

In some embodiments the at least one friction belt drive is a mule drive.

It is another objective of the current invention to provide a method for testing at least one test transmission, the method comprising the steps of: providing at least one test transmission having at least one input shaft and at least one output shaft, wherein said at least one input shaft is nonparallel and nonconcentric to said at least one output shaft; closing a mechanical loop between said at least one input shaft to said at least one output shaft by a drive train comprising at least one friction belt drive having at least one belt, wherein the gearing ratio of said at least one friction belt drive is set such that the overall gearing ratio of said drive train is less than the gearing ratio between said at least one input shaft to said at least one output shaft in said test transmission; rotating said mechanical loop by a turning device; and inducing a torque in said mechanical loop.

In some embodiments the at least one friction belt drive is twisted between nonparallel pulleys.

In some embodiments the at least one friction belt drive has substantially parallel pulleys.

In some embodiments the drive train comprises at least one slave transmission having at least one slave input shaft and at least one slave output shaft, said at least one slave input shaft and said at least one slave output shaft are oriented substantially at same angles as said at least one input shaft or said at least one output shaft of said at least one test transmission, the method further comprising the steps of: linking said at least one input shaft or said at least one output shaft of said at least one test transmission to said at least one slave input shaft or said at least one slave output shaft in a substantially parallel alignment by a connecting drive; turning said at least one slave transmission to a position in which said at least one slave input shaft or said at least one slave output shaft becomes substantially parallel to said at least one input shaft or said at least one output shaft of said at least one test transmission and rotating in the same direction; and connecting said at least one input shaft or said at least one output shaft of said at least one test transmission to said at least one slave input shaft or said at least one slave output shaft by said at least one friction belt drive with parallel pulleys.

In some embodiments at least one of said at least one slave input shaft and said at least one slave output shaft comprises a module, the method further comprising the steps of: linking said at least one input shaft or said at least one output shaft of said at least one test transmission to said at least one slave input shaft or said at least one slave output shaft in a substantially parallel alignment by a connecting drive; turning said at least one slave transmission to a position in which said at least one slave input shaft or said at least one slave output shaft becomes substantially parallel to said at least one input shaft or said at least one output shaft of said at least one test transmission and rotating in the same direction; detaching said module from said at least one slave transmission; and connecting said at least one friction belt drive with parallel pulleys between said module and said at least one slave transmission.

In some embodiments the drive train comprises at least one slave transmission and at least one gearbox having at least one gearbox input shaft, and at least one gearbox output shaft nonparallel to said at least one input shaft, the method further comprising the steps of: linking said at least one input shaft or said at least one output shaft of said at least one test transmission to the corresponding shaft of said at least one slave transmission in a substantially parallel alignment by a connecting drive; turning said at least one gearbox to a position in which two shafts in said mechanical loop align parallel; and connecting said at least one friction belt drive with parallel pulleys between said two shafts.

It is another objective of the current invention to provide a system for testing at least one test transmission comprising: at least one test transmission having at least one input shaft and at least one output shaft; a drive train closing a mechanical loop between said at least one input shaft to said at least one output shaft, said drive train comprising at least one friction belt drive with at least one belt, the overall gearing ratio of said drive train is less than the gearing ratio between said at least one input shaft to said at least one output shaft in said test transmission; and a turning device for rotating said mechanical loop, wherein said at least one friction belt drive comprises a tension control device changing the tension of said at least one belt such that the operation of said at least one belt changes from slippage to creepage during rotation of said mechanical loop, thus generating torque in said mechanical loop;

It is yet another objective of the current invention to provide a method of testing at least one test transmission having at least one input shaft and at least one output shaft, the method comprising the steps of: closing a mechanical loop between at least one input shaft of a test transmission to at least one output shaft of said test transmission by a drive train comprising at least one friction belt drive having at least one belt, wherein the gearing ratio of said at least one friction belt drive is set such that the overall gearing ratio of said drive train is less than the gearing ratio between said at least one input shaft to said at least one output shaft in said test transmission; rotating said mechanical loop by a turning device; and inducing a torque in said mechanical loop through a tension control device by changing the tension of said at least one belt such that the operation of said at least one belt changes from slippage to creepage during rotation of said mechanical loop.

Unless otherwise defined, all technical and scientific terms used herein have the same meaning as commonly understood by one of ordinary skill in the art to which this invention belongs. Although methods and materials similar or equivalent to those described herein can be used in the practice or testing of the present invention, suitable methods and materials are described below. In case of conflict, the patent specification, including definitions, will control. In addition, the materials, methods, and examples are illustrative only and not intended to be limiting.

BRIEF DESCRIPTION OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings.

DESCRIPTION OF SOME EMBODIMENTS

Figure 1:
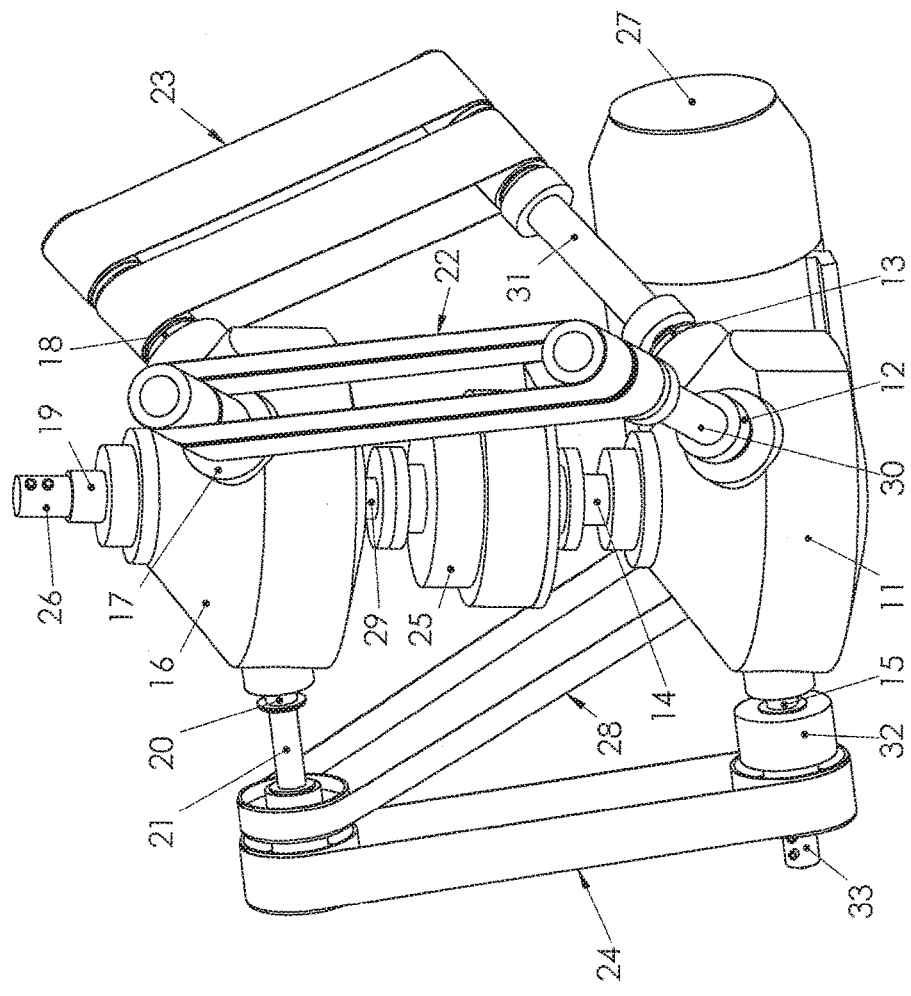
FIG. 1 is a diagrammatic perspective view of mechanical power loops closed by a slave transmission and flat belt drives, in a test rig that runs a main helicopter transmission in a 'top to bottom' configuration.

Before explaining at least one embodiment of the invention in detail, it is to be understood that the invention is not necessarily limited in its application to the details set forth in the following description or exemplified by the Examples. The invention is capable of other embodiments or of being practiced or carried out in various ways.

The terms "comprises", "comprising", "includes", "including", and "having" together with their conjugates mean "including but not limited to".

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible sub-ranges as well as individual numerical values within that range.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination or as suitable in any other described embodiment of the invention. Certain features described in the context of various embodiments are not to be considered essential features of those embodiments, unless the embodiment is inoperative without those elements.

In discussion of the various figures described herein below, like numbers refer to like parts. The drawings are generally not to scale. For clarity, non-essential elements were omitted from some of the drawing.

General

In the embodiments described in the following, a helicopter main transmission and helicopter nose, intermediate and tail gearboxes have been chosen to represent all kinds of transmissions and gearboxes. This choice is because rigs for testing these units are the main scope of this invention and the fact that these are among the most demanding transmissions and gearboxes, mechanically and geometrically complex, having extreme speeds and torques, in particular the main and nose gearboxes. The main transmission is schematically drawn in the figures with two symmetric inputs and two outputs, oriented at different angles and different offsets one relative to the other, representing a typical main transmission powered by two engines. The nose gearboxes are drawn with shafts that intersect at an angle different from 90°. The embodiments shown in the figures represent different possible combinations of connections between the units, alone or integrated.

The drawings in the figures display only the spatial arrangement of the transmissions and gearboxes with the connections between them, without showing the frame of the rig that holds them in that position. This is because different transmissions or gearboxes have different anchoring points and the particular construction of each rig's frame according to the specific casing of each gearbox is irrelevant to the implementation of the present invention. Accordingly, the belt drives are displayed only as two pulleys with the belt or belts, without the supporting frame, bearings or the tensioning device. There are many ways to design such a system; it lies within ordinary mechanical engineering practice and the actual design is likewise insignificant to the present invention.

In FIG. 1, a rig for testing a helicopter main transmission is displayed. The main transmission to be tested is referred by numeral 11. This transmission has two input shafts 12 and 13, a main output shaft 14 known as 'mast' and a secondary output 'tail rotor' shaft 15. In the rig, mast 14 may be replaced by a special manufactured slave shaft 29. In the aircraft, the power is received by the input shafts 12 and 13 through driveshafts from nose gearboxes (not shown here) that are connected to two identical turboshaft engines. The mast 14 is directly connected to the main rotor and the tail rotor shaft 15 is connected by driveshafts to the intermediate and tail rotor gearboxes which power the tail rotor. The input shafts 12 and 13 are symmetrically oriented relative to a plane in which the axis of the mast lies but the spatial angles and offsets between them and between them and the mast may vary. The drawn values seen in the figure are typical to an ordinary main helicopter transmission. Similarly, the tail rotor shaft 15 is set at an offset to mast 14 and inclined at an angle different than 90° relative to the mast, but is parallel to the symmetry plane of the input shafts. The drawn values seen in the figure are typical as well to an ordinary main helicopter transmission. In the embodiment of FIG. 1, these specific relations of symmetry of the input shafts or parallelism of the tail rotor shaft are to be viewed as non-limiting examples, and transmissions having other relations could be used as well in this configuration.

In FIG. 1, as in some following figures, a main transmission 16, identical to the tested transmission 11, serves as a 'slave' transmission. As indicated above, this transmission may not be identical to the tested transmission but for certain embodiments, such as in this figure and in FIGS. 2, 4 and 5, the spatial orientation of the input and output shafts of the slave transmission nave to be the same as to those of the tested transmission. The gear ratios inside the transmissions may differ, as the difference in diameter between the pulleys of the belt drives that close the mechanical loops can compensate for these differences. In FIG. 1, the slave transmission 16 is located over transmission 11 in a 'top to bottom' configuration. The mast 19 of transmission 16 is concentric to mast 14 of the tested transmission 11. The slave transmission 16 is also oriented in a 'front with front' position so that its input shaft 17 lies exactly over the corresponding input shaft 12 of the tested transmission 11. The orientation is made by rotating transmission 16 around the axis of its mast 19. This specific orientation and alignment of the masts, aligns all the input shafts 17 and 18 of the slave transmission 16 and its tail rotor shaft 20 parallel to the corresponding shafts 12, 13, 15 of the tested transmission and every shaft is also turning in the same direction as its corresponding shaft when the masts 14 and 19 are connected.

This parallel alignment and identical direction of rotation of the shafts enable their connection through belt drives. The belt drives 22 and 23 connecting the input shafts transmit most of the power so they are shown to have two flat belts each. Belt drive 24 that connects the tail rotor shafts transmits less power at a lower speed so it is shown to have only one narrower flat belt and pulleys of greater diameter. The tension of the belt in all these belt drives is preset before operation. The maximum torque of each of the belt drives are designed to transmit exceeds the required torque with a margin of safety, meaning that at the required torque the creep of the belts does not reach the maximum allowable creep over which slippage occurs. Because the input shafts 12 and 13 have an angle other than 90° with respect to mast 14, the distance of belt drives 22 and 23 from transmission 11 is different from their distance from the slave transmission 16. Driveshafts 30 and 31 are therefore added to fill that distance gap. The same applies for driveshaft 21, which fills the similar distance gap at the tail rotor shafts. To simulate the conditions of the tested transmission in the aircraft, belt drives 22 and 23 transmit power from the slave transmission 16 to the tested transmission 11 while belt drive 24 transmits power from the tested transmission to the slave transmission. As a consequence of this and the fact that the corresponding shafts of the two transmissions turn in the same direction, the shafts and gears of the slave transmission are torqued in the opposite direction to the corresponding shafts of the tested transmission. As explained, the pulleys of each belt drive have unequal diameters, the driven ones being a little bit smaller than the driving ones. To get the power to be transmitted in the right direction as described above, the pulleys of belt drives 22 and 23 that are connected to the shafts 30 and 31 correspondingly of the tested transmission 11, are smaller than those connected to the slave transmission 16. For belt drive 24 which takes away power from transmission 11, the situation is inverted so that the pulley which is connected to the slave transmission 16 by driveshaft 21 is the smaller than the pulley connected to driveshaft 20.

The connection between the masts 14, 19 of the tested transmission 11 and the slave transmission 16 in FIG. 1 is done through a hydraulic clutch 25 which generates the torque in the loops of the input shafts 12, 13, 17 and 18. The clutch is enclosed in a case connected to the frame of the rig (the frame is not seen in these figures). Like an ordinary clutch, clutch 25 is composed of two rotating elements; one is connected to mast 14, the other to mast 19. To implement this connection to mast 19, the case of the sump of the slave transmission 16 is removed or drilled through, and an intermediate internal mast or a slave mast 29 is manufactured and mounted so that it goes through the bottom of transmission 16 and connects mast 19 to the clutch element. The sump can be sealed by uniting it with the case of the clutch 25. A rotating union 26 is attached to mast 19 and two pipe lines (not seen in this figure) for oil that reach the clutch are made inside the mast and the slave mast. This is possible since the transmission musts are hollow. Union 26 supplies under rotation two oil lines to the clutch, one for building the pressure that activates the clutch, the other for cooling its discs. The cooling oil is collected in the case of the clutch, then chilled and routed back.

In the embodiment in FIG. 1 there are three loops, two 'input loops' closed by belt drives 22, 23 and one 'tail rotor loop' closed by belt drive 24. All have a common section—masts 14 and 19 with clutch 25 and the gear trains inside the transmissions to which they are connected. By activating clutch 25, torque is created in all the loops unless a disconnection is made in a loop. Such a disconnection is made in this embodiment in the tail rotor loop by inserting an additional clutch 32 in this loop. In the depicted exemplary embodiment, clutch 32 is oil activated through rotating union 33. In this way, the tail rotor loop can be controlled separately from the input loops meaning that torque can be created in it by clutch 32 indifferent of the torque present in the input loops caused by clutch 25. This is usually required by the testing schedule. As most transmissions of its kind, transmission 11 receive the power at input shafts 12 and 13 from two identical engines so the gear train inside the transmission from each input to the output mast 14 is the same. As a consequence, when clutch 25 is activated, the torque produced in both input loops is equal. The final performance test run usually requires that equality, so the embodiment in FIG. 1 complies with that requirement. Sometimes it is also required to run only one of the input loops to simulate a failure of one engine. In that case, a disconnection must be made in the other loop such as removing a connecting part, for example shaft 30 or 31 or inserting a disengaging clutch in the loop if the disconnection is to be made while the shafts are turning. An alternative is to replace clutch 25 with, for example, two high speed clutches in place of shafts 30 and 31 and control the torque in each of the input loops separately.

In FIG. 1 as well as in the other figures, an electrical motor 27 is turning the whole system through a belt drive 28. An electrical motor is only an option and other turning devices such as a turbine, a hydraulic motor or an internal combustion engine may be considered. As explained, the motor only compensates for the friction losses in the transmissions, the clutches and the belt drives. Its power is therefore considerable less than the power that run in the loops and consequently in the tested transmission. The power losses in the clutches 25 and 32 depend on their slippage, meaning the velocity between their two elements. This slippage is determined by the difference between the diameters of the pulleys in the belt drives. Therefore, this difference should be made small so that at maximum power it should compensate only for the differences in velocities caused by the creep of the belts and an additional minimum slippage in the clutches that is needed to allow a full control on the torques. Reducing the slippage in the clutches reduces the size of motor 27.

As explained, an additional advantage of belt drives over gearboxes is their ability to take deformations of the test rig during operation. In the embodiment shown in FIG. 1, the high torque created by clutch 25 is deforming the rig frame so that transmissions 11 and 16 twist a little bit one relative to the other around their masts, moving away from the 'front with front' orientation. It should be noted that forces on the rig while during the tests are large, and torques of the main rotor can be on the order of 6,500 kg-m or bigger. Thus, deformation of the rig may be unavoidable. This changes the position of the shafts of the slave transmission 16 from their initial parallel position with regard to the shafts of the tested transmission 11. Preferably, the transmissions are initially oriented in a slightly nonparallel position so that the twist between the transmissions at full (or near full) torque aligns them parallel. The supporting frames of the belt drives can be made flexible enough to yield under these twisting deformations so that each pulley remains concentric to the shaft to which it is attached. In this condition, the belt drives will continue to function normally since small deformation of the pulleys from their parallel position has no influence on the performance of the belt drive.

Figure 2:
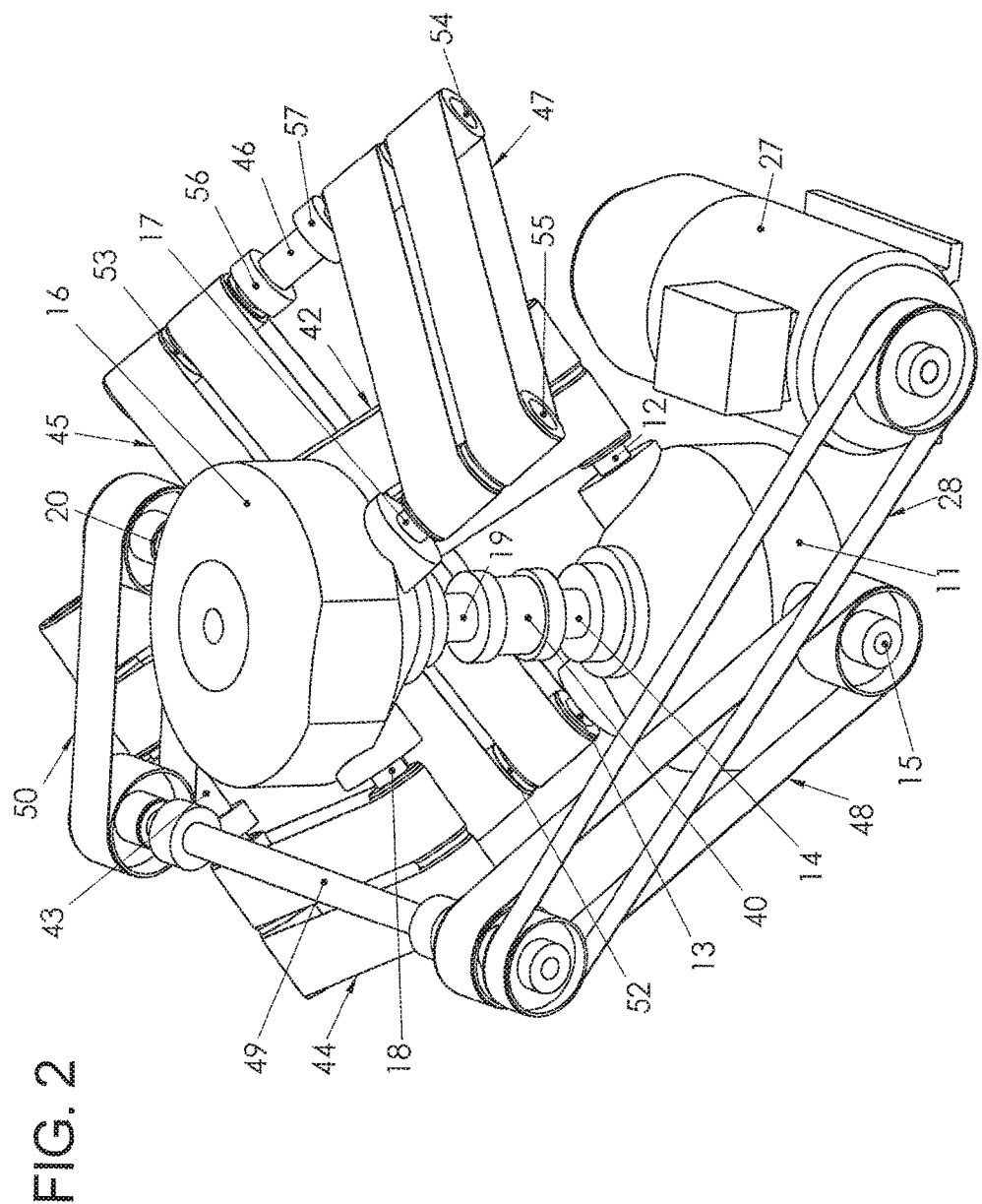
FIG. 2 is a diagrammatic perspective view of mechanical power loops closed by a slave transmission and flat belt drives, in a test rig that runs a main helicopter transmission in a 'top to top' configuration.

In FIG. 2 the same tested transmission 11 is running with its identical slave transmission 16 in a 'top to top' configuration. While in the 'top to bottom' configuration of FIG. 1 the gears in the slave transmission 16 rotate in the same direction as the tested transmission 11 but are torqued in opposite direction, in this 'top to top' configuration they are torqued in the same direction but turn in the opposite direction. As can be seen by comparing the drawings, closing the loops by belt drives in this 'top to top' configuration of FIG. 2 is more complicate than in FIG. 1. Additional complication may be present as the oil system in the slave transmission 16 may need to be changed or replaced. Since the sump is upside down and the internal oil pump turns in the opposite direction. The sump and the internal oil pump may be replaced by an external oil reservoir and an external pump. Many of the oil jets inside the transmission may also need replacement or redirection. The reason of choosing this configuration is because in many cases the 'top to top' configuration may not be an option. While the planetary units inside the transmission have usually spur gears which are indifferent to the direction of the torque, helical gears if used in the slave transmission, yield opposite axial force when the torque is reversed. The spiral bevel gears in the input quills produce opposite axial force and usually increased radial force upon inverted torque. Still, the gears are mounted rigidly and practice shows that in a certain test rig, a specific main transmission runs on full opposite torque with no problems. This however may not be the case of every transmission.

As in FIG. 1, the masts 14 and 19 of the tested and slave transmissions respectively are aligned concentric but in this embodiment they are connected directly by a rigid coupling 40 without a clutch or other torque generator between them. To obtain the parallel alignment and same direction of rotation between the shafts of the tested transmission and that of the slave one, the slave transmission 16 is rotated around its mast 19 to a 'front with back' orientation with respect to the tested transmission 11. This orientation is directed at exactly 180° relative to the 'front with front' orientation of the embodiment in FIG. 1. The parallel alignment is obtained in this orientation not between shaft 12 of the tested transmission and its corresponding shaft 17 of the slave transmission but between shaft 12 and shaft 18 which is the symmetric shaft to shaft 17. Likewise a parallel alignment is obtained between shafts 13 and 17 instead of between the corresponding shafts 13 and 18. Because the input shafts 12 and 13 of this transmission are symmetrical and identical, a switching of connections of the belt drives between these shafts makes no difference. The parallel alignment between the tail rotor shafts 15 and 20 is obtained too in this configuration since they lie in parallel planes relative to the symmetry plane of the input shafts.

As seen, closing the loops between the shafts of the two transmissions cannot be obtained in this embodiment directly by one belt drive but by a minimum of two for each pair of shafts. Additional driveshafts must be consequently added. The connection between input shaft 12 and shaft 18 is routed through belt drive 42, driveshaft 43 and belt drive 44. Likewise, the connection between input shafts 13 and 17 passes through belt drive 45, drive shaft 46 and belt drive 47. The tail rotor shaft 15 of the tested transmission is connected by belt drive 48, driveshaft 49 and belt drive 50 to the tail rotor shaft 20 of the slave transmission. The length of the belts and the length and spatial position of the driveshafts must be planned so that they do not intersect with each other.

The method for producing the torque in this embodiment of FIG. 2 is by tensioning the belts during operation (tension controlling devices are not seen in this figure to reduce cluttering). As explained, no torque generator devices other than the belt drives themselves are required for the application of this method. Another advantage is that it is possible to disconnect the load of each belt individually to simulate an engine failure without any additional devices or changes in the rig. The rule that the smaller driven pulleys are connected to the shafts that transmit power into a transmission is implemented in this case by calculating the overall reduction ratio of both belt drives in each loop. For example, normally the diameter of pulley 52 would be made smaller than that of pulley 53 and the diameter of pulley 54 smaller than that of pulley 55 by an amount that compensates for the creep and slip in each belt at maximum torque. Since the elongation of aramid fibers flat belts is about 0.5% at rated tension, when designed for full load at that tension, the belt's creep would be 0.5%. If the ratio between the diameters of the drive pulleys is set to 1:1.005, full load may be applied with only creep and no slip present at that load. Actually, the differences in the diameters of the pulleys of each drive can be different as long as the overall reduction ratio between shaft 12 and shaft 18 complies with that amount of creep and slip. The belts in this embodiment work while slippage and creep are both present. At maximum torque, the belt drives should be designed with two margins of safety: The first is by letting a small slippage at the maximum required torque that allows a full control on the torque. The second is that the energy loss from both slippage and creep at the maximum required torque and speed does not reach the energy loss that would result from loading the belt to its maximum allowable creep. The tensioning of the belts for producing the torque may be made on only one of the two belt drives in each loop, while on the other the tension can be preset with no change during operation. In this case, the creep that has to be accounted for the energy loss calculation mentioned above is the maximum creep of both pulleys. Tensioning of the belts is usually done either by additional tensioner idler pulleys or by increasing the distance between the two pulleys of the belt drive using hydraulic cylinders for example. Changing this distance in only one belt drive of each loop saves a tensioning mechanism but creates a deformation in the geometry of the loop. For example if shaft 46 is connected rigidly to pulleys 53 and 54, changing the distance between pulleys 54 and 55 causes all the pulleys in the loop—52, 53, 54, and 55 to become nonparallel. Because the elongation of flat belts and in particular those made from aramid fibers is relatively very small in comparison to the dimensions of the loop, the small deviation from parallelism may cause a small axial relocation of the belts on the pulleys but has no influence on their performance. Another alternative is to keep the pulleys parallel and to insert flexible couplings which accommodate angular misalignment such as couplings 56 and 57 between shaft 46 and pulleys 53 and 54. Of course, changing the distance of both belt drives 47 and 45 by pulling both pulleys 53 and 54 with shaft 46 as a unity creates no deformation.

Figure 3:
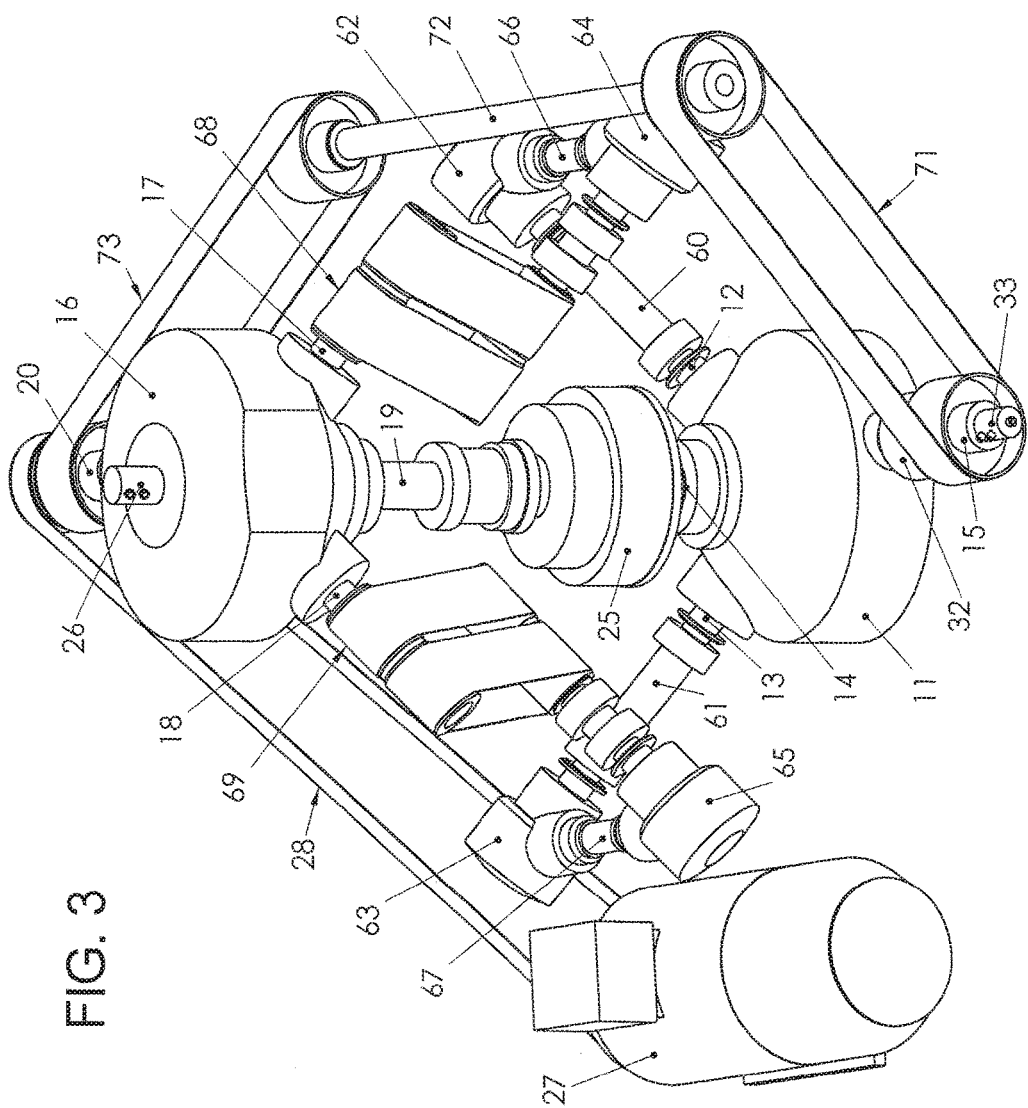
FIG. 3 is a diagrammatic perspective view of mechanical power loops closed by slave transmissions and flat belt drives, in a test rig that runs a main helicopter transmission with two nose gearboxes in a 'top to top' configuration.

In FIG. 3 the same transmission 11 is tested together with two nose gearboxes 62 and 63. To each of these gearboxes, identical slave nose gearboxes 64 and 65 respectively are connected in a 'top to top' configuration, meaning that the input shafts are set concentric and joined by couplings 66 and 67 respectively. These input shafts, driven in the aircraft by the engines, rotate at speeds usually over 20,000 RPM. The tested transmission 11 and its identical slave transmission 16 are connected by their masts 14 and 19 respectively in a 'top to top' configuration through clutch 25. The orientation of the slave transmission 16 is 'front with back' so that the tail rotor shafts 15 and 20 of the tested and slave transmissions respectively become parallel and turn in the same direction. This orientation is the same as in the embodiment in FIG. 2 but the main loops in this configuration are closed between the corresponding input shafts 12 and 17 and 13 and 18, which are not parallel. Thus the fact that the input shafts 12 and 13 are symmetrical is of no relevance in this configuration and they could be likewise placed and oriented at any position. The 'front with back' is defined only regarding to the orientation of the tail rotor shafts 15 and 20. Once the orientation of the slave transmission 16 is determined, the orientation of all the nose gearboxes, tested and slave is determined too. The output shafts of the tested nose gearboxes 62 and 63 are connected to the input shafts 12 and 13 of the tested transmission 11 by driveshafts 60, 61 respectively, as in the aircraft. The output shafts of the slave nose gearboxes 64 and 65 are set parallel to the input shafts 17 and 18 respectively of the slave transmission 16. This is always possible by making rotations of the tested nose gearboxes around their output shafts and of the slave nose gearboxes around their input shafts. Due to symmetry, when the main tested transmission 11 is oriented as in the aircraft, the parallel alignment obtained through these rotations turn the tested nose gearboxes to be oriented as in the aircraft too, regarding their input shafts. The spatial location of the nose gearboxes can however be changed and depends on the distance between the main transmissions 11 and 16 and the distance between the nose gearboxes in each pair 62, 64 and 63, 65. The loops of the input shafts are closed by belt drives 68 and 69. The loop of the tail rotor shafts is closed by belt drive 71, shaft 72 and belt drive 73. The tension in all the belt drives is preset and torque is induced in the input loops by clutch 25 which is activated hydraulically through rotating union 26 and in the tail rotor loop by clutch 32 which is activated through rotating union 33 as in the embodiment in FIG. 1.

Figure 4:
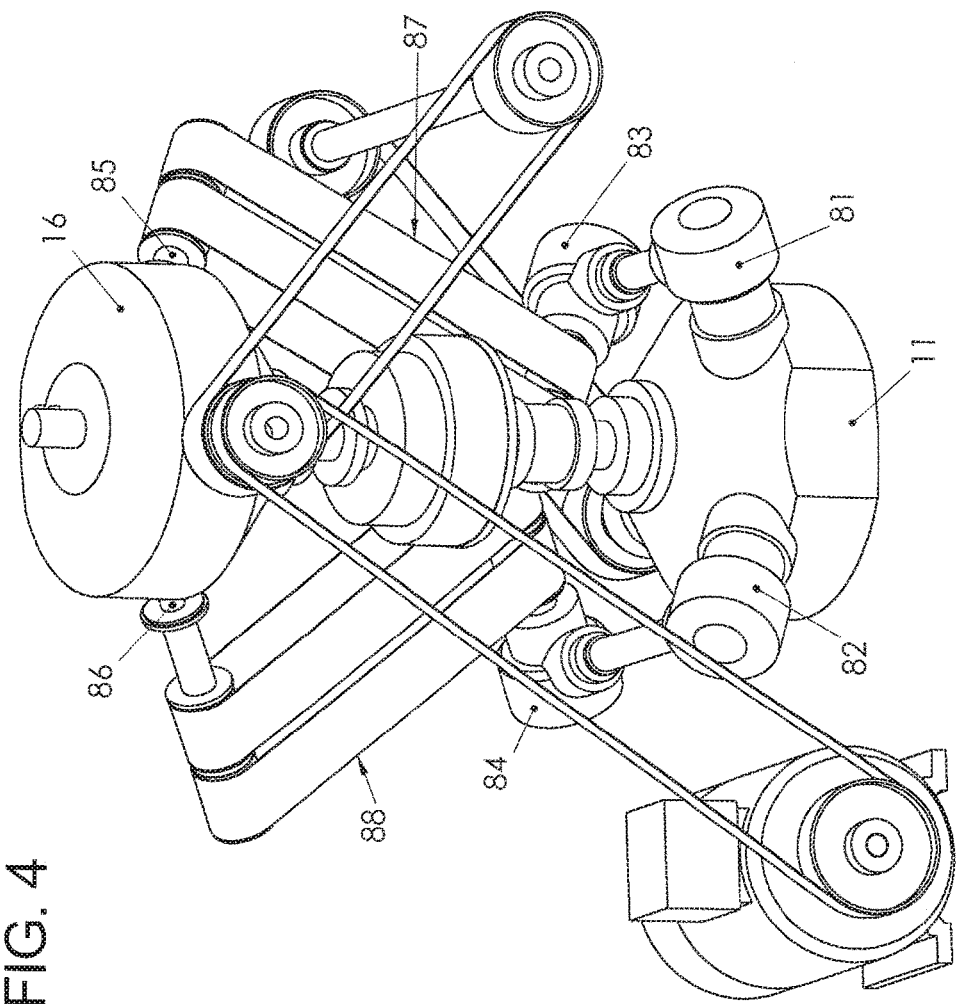
FIG. 4 is a diagrammatic perspective view of mechanical power loops closed by a slave transmission and flat belt drives, in a test rig that runs a main helicopter transmission having input modules with high-speed shafts, in a 'top to top' configuration.

The 'top to top' embodiment in FIG. 4 is similar to that in FIG. 3. The difference is that the tested transmission 11 in this embodiment is of the type with input shafts coupled directly to the engines, that is, having rotational input speeds around or over 20,000 RPM. The input modules, 81 and 82 of such a transmission resemble in their outcome nose gearboxes. In the slave transmission 16, the corresponding modules 83, 84 are detached from the slave transmission, oriented coaxially, and connected directly at their high-speed shafts to the input shafts of modules 81, 82 respectively. Modules 83, 84 are further rotated about their input axes to attain a parallel orientation between their output shafts and the corresponding remaining inner shafts in slave transmission 16 to which these output shafts were connected before the modules were detached. Additional shafts, 85 and 86 are connected to these inner shafts of the slave transmission and belt drives 87 and 88 are connected to close the loops. In this way, belt drives 87 and 88 are operating at lower speeds than the rotational speed of the engines. As a result of the detachment of the input modules, naked openings are exposed, both on the slave transmission 11 and on modules 83 and 84. Protecting coverings or caps, comprising outlets with oil seals for the exiting shafts, must therefore be installed.

Figure 5:
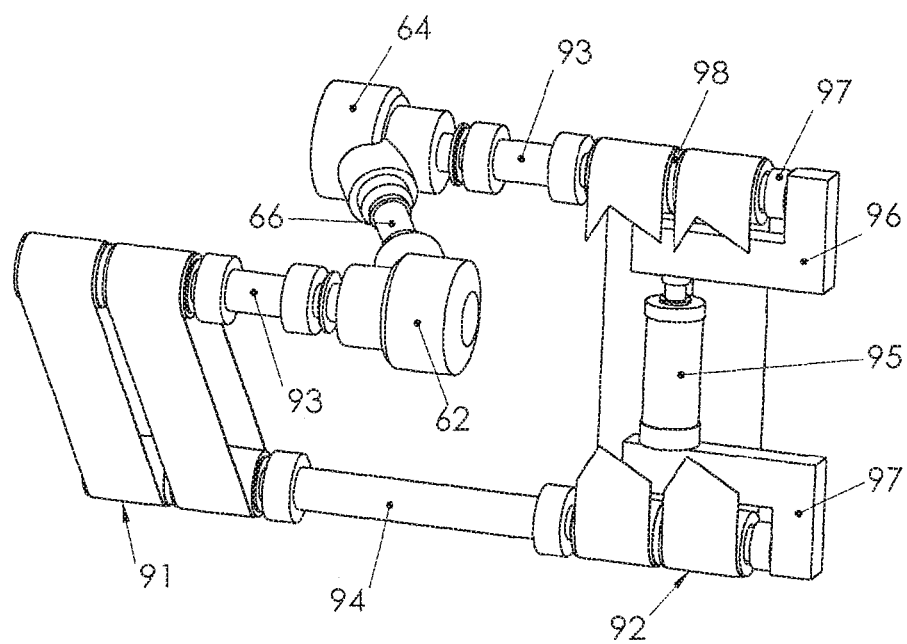
FIG. 5 is a diagrammatic perspective view of a mechanical power loop closed by a slave transmission and flat belt drives, in a test rig that runs a nose helicopter gearbox in a 'front to front' configuration.

FIG. 5 displays a closed loop testing of a nose gearbox 62 such as the gearbox presented in FIG. 3, using only a slave nose gearbox 64 and belt drives 91 and 92. The two gearboxes' high speed shafts are similarly connected by coupling 66 in a 'top to top' or 'front to front' configuration. The loop is closed by two driveshafts 93 and one driveshaft 94. In this embodiment, the torque in the loop is created by tensioning the belts of drive 92 while the tension of the belts in drive 91 is preset. The method of tensioning the belts during operation is by applying oil pressure to cylinder 95. The belts of drive 92 in this figure are shown sectioned to reveal this cylinder. Cylinder 95 pushes away two U shaped rigid brackets 96. Each bracket comprises a stationary rigid shaft 97 which protrudes into its adjacent pulley. The pulley is rotating on bearings which are mounted on that shaft 97. Cylinder 95 is positioned amid the space between the identical belts of belt drive 92, so that the two belts are equally tensioned. This position also obviates the necessity to connect the brackets 96 by guiding rails at least in the direction of operation of the cylinder. The parallelism between the two pulleys of the belt drive 92 is maintained by the belts. Driveshafts 93 and 94 can be rigid, that is, without flexible couplings. In this case, the construction of the supporting rig may provide a change of the angle between the plane defined by the gearboxes' axes and the plane defined by the pulleys' axes of belt drive 91. This provision is to be made in order to compensate for the change of distance between the pulleys of drive 92 during tensioning. The other possibility is that at least one driveshaft, for example shaft 94, has angular flexible couplings.

Figure 6:
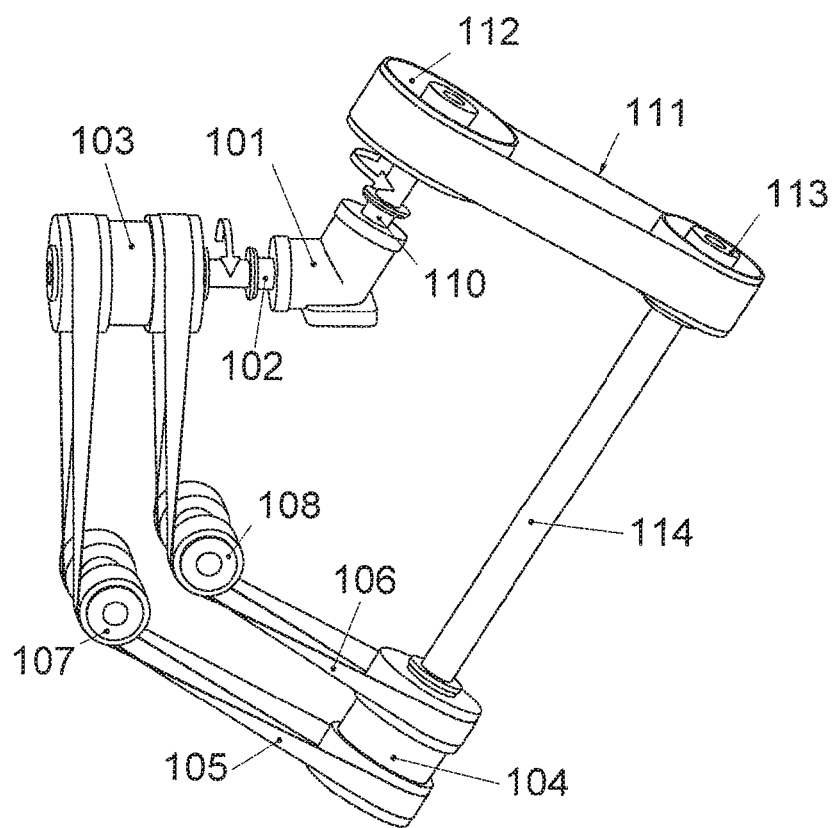
FIG. 6 is a diagrammatic perspective view of a mechanical power loop closed by flat belt drives, in a test rig that runs an intermediate helicopter gearbox.
Figure 7:
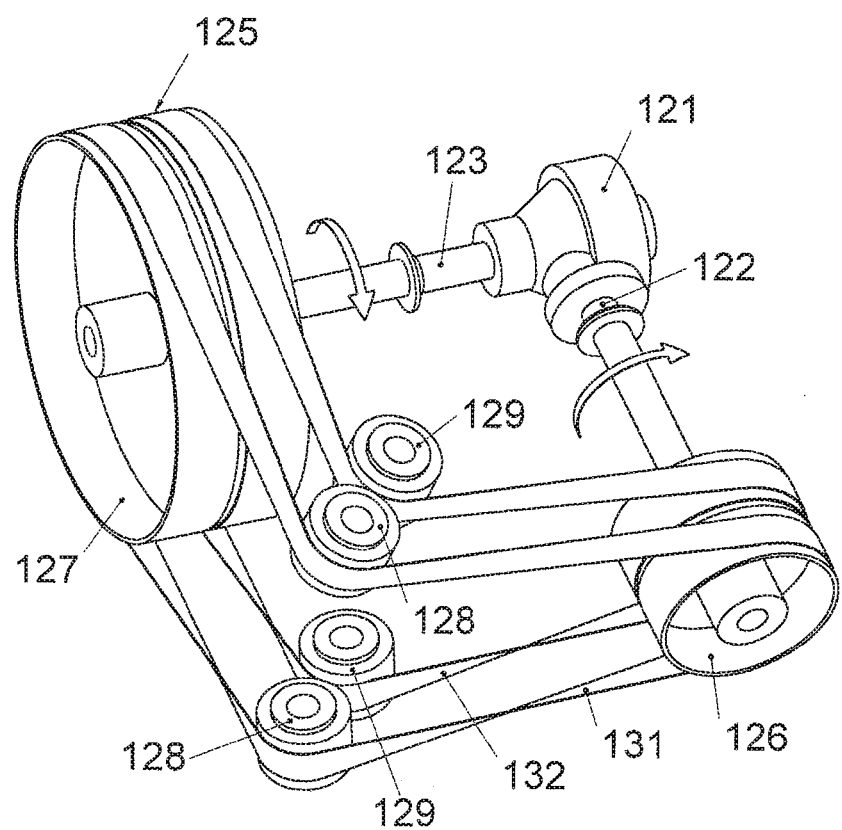
FIG. 7 is a diagrammatic perspective view of a mechanical power loop closed by a flat belt drive, in a test rig that runs a tail helicopter gearbox.

In FIGS. 5, 6, and 7, the driving motor (equivalent to numeral 27 in the previous figures) and its connecting drives was omitted to reduce cluttering the figures. It should be noted that while motor 27 is seen connected with a belt drive to the testing system, other methods of connecting it may be used.

The closed loop displayed in FIG. 5 may be implemented also for gearboxes such as an intermediate gearbox or a tail gearbox of a helicopter, though another method of closing the loop without slave gearboxes is presented in the following figures.

In FIG. 6, an intermediate gearbox 101 of a helicopter is shown in a closed loading loop produced by belt drives alone. These belt drives make up for the angle between the input and output shafts of the gearbox as well as for the reduction ratio of the gears, obviating the use of a slave gearbox. This method of closing the loops only through belt drives is applicable for single gearboxes as well as for a set of gearboxes, for example, running the intermediate gearbox together with the tail gearbox. The arrows show the direction of rotation of the shafts. The input shaft 102 of the gearbox is connected to pulley 103 which is driven through pulley 104 by two belts, 105 and 106. The belts are twisted and bended over guiding pair of pulleys 107 and 108 respectively at an angle which conforms to the angle between the shafts of the gearbox. This arrangement is known as a 'mule' drive. Though seldom used and usually designed with V belts for light load applications, by using flat belts, in particular those with aramid fibers and more than one belt, hundreds of horsepower can be transmitted, as for example required by this application. The twisting of the belts is limited by their width and the distance between the pulleys and the guiding pulleys, so these belts must be relatively narrow.

The load capacity of the drive can be increased by three methods: The first method comprises adding more belts. The second method comprises increasing the diameter of the pulleys, 103 and 104 in this figure. And the third method comprises increasing the length and accordingly the width of the belts. The third method can be implemented in the embodiment of FIG. 6 by increasing the distance between pulley 103 and gearbox 101 and lengthening driveshaft 114 accordingly.

In this exemplary embodiment, pulleys 103 and 104 are identical and the difference in the rotational speeds of the input 102 and output 110 shafts is taken by drive 111 through the difference in the diameters of its pulleys, 112 and 113. The torque in the loop is created by tensioning the belts of one drive or the other or both. Tensioning the belts of the mule drive can be done also by displacing the pulleys axially along their shafts. Alternatively, a torque generator, for example a clutch, can be connected between pulleys 104 and 113 for instance, instead of shaft 114.

FIG. 7 displays a tail gearbox 121 of a helicopter in a loading loop closed by a 'mule' flat belts drive referenced by numeral 125. The fact that on this gearbox the input shaft 122 is at right angle with the output shaft 123 is of no significance to this kind of drive which can be adjusted to any angle, as the drive in FIG. 6 demonstrates. The main difference between this tail gearbox and the intermediate gearbox in FIG. 6 is that their output shafts rotate in opposite directions relative to their input shafts, as can be seen by the direction of the arrows. The direction of rotation is determined by the side the bevel gear which drives the output shaft is located relative to the bevel pinion gear which drives the input shaft. In this tail gearbox 121, this gear is on the side of the input shaft 122 which is opposite to the extension of the output shaft 123. The position and orientation of belt drive 125 conforms to this direction of rotation. Unlike the 'mule' drive in FIG. 6, in this configuration drive 125 needs also to make up for the difference in the rotational speeds between the output and input shafts of the tail gearbox. Thus, pulley 126 which is driving the input shaft 122 has a much smaller diameter than pulley 127 which is driven by the output shaft 123. The ratio between the pulleys' diameters is in accordance with the gearing ratio and, as on all closed loops on all other embodiments, to the compensation for the creepage of the belts required by the torquing. Due to this difference of the diameters of the pulleys, the two guiding pulleys 128 which direct belt 131 cannot be centered concentric and connected as those on the drive in FIG. 6. The same is true for the two guiding pulleys 129 which direct belt 132. Their axes of rotation must be set perpendicular to certain planes which are tangential to pulleys 126, 127 to prevent the belts from running off these guiding pulleys. The torque in the loop is created through tensioning of the belts by pulling at least one guiding pulley of each belt away from at least one of the pulleys 126, 127. As a result of this pulling, the belts shift axially by a small amount on pulleys 126, 127 due to the elongation of the belts under tension.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

The invention claimed is:

1. A system for running at least one test transmission, comprising:
   a. at least one test transmission having at least one input shaft and at least one output shaft, said at least one input shaft being nonconcentric and nonparallel relative to said at least one output shaft;
   b. a drive train closing a mechanical loop between said at least one input shaft to said at least one output shaft; wherein said drive train comprises at least one friction belt drive having at least one belt, the overall gearing ratio of said drive train is less than the gearing ratio in said at least one transmission between said at least one input shaft and said at least one output shaft;
   c. a turning device for rotating said mechanical loop, and
   d. at least one torque producing device, wherein said torque producing device changes the tension of said at least one belt such that the operation in said mechanical loop turns from slippage to creepage in said at least one belt during rotation.

2. The system of claim 1 wherein said at least one torque producing device comprises a tension control device, said tension control device constructed to change the tension in said at least one friction belt drive during rotation of said mechanical loop.

3. The system of claim 1 wherein said at least one torque producing device includes a torque generator for generating torque in said mechanical loop.

4. The system of claim 3 wherein said torque generator is a clutch, said clutch constructed to operate constantly under slippage.

5. The system of claim 1 wherein said at least one test transmission is one of: a helicopter main transmission; and a helicopter gearbox.

6. The system of claim 1 wherein said at least one belt is a flat belt.

7. The system for testing at least one test transmission of claim 6 wherein said flat belt comprises aramid fibers.

8. The system of claim 1 wherein the pulleys of said at least one friction belt drive are substantially parallel.

9. The system of claim 8 wherein said drive train comprises at least one slave transmission, said slave transmission having at least one slave input shaft and at least one slave output shaft oriented substantially at same angles as said at least one input shaft and said at least one output shaft of said at least one test transmission;
   wherein said at least one slave transmission is placed in a position in which said at least one slave input shaft and said at least one slave output shaft become substantially parallel to said at least one input shaft and said at least one output shaft of said at least one test transmission and rotating in the same direction, thus enabling the connection of said at least one friction belt drive with parallel pulleys.

10. The system of claim 9 wherein said at least one slave transmission is substantially identical to said at least one test transmission.

11. The system of claim 9 wherein said at least one slave transmission is oriented 'top to bottom' and 'front with front' with respect to said at least one test transmission.

12. The system of claim 9 wherein said at least one slave transmission is oriented 'top to top' and 'front with back' with respect to said at least one test transmission.

13. The system of claim 9 wherein at least one of said at least one slave input shaft and said at least one slave output shaft comprises a module detached from said at least one slave transmission,
   wherein at least one of said at least one friction belt drive is connected between said module and said at least one slave transmission.

14. The system of claim 8 wherein said drive train comprises at least one slave transmission and at least one gearbox having at least one gearbox input shaft and at least one gearbox output shaft nonparallel to said at least one gearbox input shaft,
   wherein said at least one gearbox enables closing said mechanical loop by said at least one friction belt drive with parallel pulleys where the input and output shafts of said at least one slave transmission are not positioned parallel to at least one of said at least one input shaft and said at least one output shaft of said at least one test transmission.

15. The system of claim 1 wherein said at least one belt is twisted between nonparallel pulleys.

16. The system of claim 15 wherein said at least one friction belt drive is a mule drive.

17. A method for running at least one test transmission, the method comprising the steps of:
   a. providing at least one test transmission having at least one input shaft and at least one output shaft, wherein said at least one input shaft is nonconcentric and nonparallel to said at least one output shaft;
   b. closing a mechanical loop between said at least one input shaft to said at least one output shaft by a drive train comprising at least one friction belt drive having at least one belt,
   wherein the gearing ratio of said at least one friction belt drive is set such that the overall gearing ratio of said drive train is less than the gearing ratio in said at least one transmission between said at least one input shaft to said at least one output shaft in said test transmission;
   c. rotating said mechanical loop by a turning device; and
   d. inducing torque in said mechanical loop by at least one torque producing device, wherein said torque producing device changes the tension of said at least one belt such that the operation in said mechanical loop turns from slippage to creepage in said at least one belt during rotation.

18. The method claim 17, wherein said at least one belt is twisted between nonparallel pulleys.

19. The method of claim 17 wherein said at least one friction belt drive has substantially parallel pulleys.

20. The method of claim 19, wherein said drive train comprises at least one slave transmission having at least one slave input shaft and at least one slave output shaft, said at least one slave input shaft and said at least one slave output shaft oriented substantially at same angles as said at least one input shaft and said at least one output shaft of said at least one test transmission, the method further comprising the steps of:
 a. linking said at least one input shaft or said at least one output shaft of said at least one test transmission to said at least one slave input shaft or said at least one slave output shaft in a substantially parallel alignment by a connecting drive;
 b. turning said at least one slave transmission to a position in which said at least one slave input shaft or said at least one slave output shaft becomes substantially parallel to said at least one input shaft or said at least one output shaft of said at least one test transmission and rotating in the same direction; and
 c. connecting said at least one input shaft or said at least one output shaft of said at least one test transmission to the said at least one slave input shaft or said at least one slave output shaft by said at least one friction belt drive with parallel pulleys.

21. The method of claim 19, wherein at least one of said at least one slave input shaft and said at least one slave output shaft originally comprises a module, the method further comprising the steps of:
 a. linking said at least one input shaft or said at least one output shaft of said at least one test transmission to said at least one slave input shaft or said at least one slave output shaft in a substantially parallel alignment by a connecting drive;
 b. turning said at least one slave transmission to a position in which said at least one slave input shaft or said at least one slave output shaft becomes substantially parallel to said at least one input shaft or said at least one output shaft of said at least one test transmission and rotating in the same direction;
 c. detaching said module from said at least one slave transmission; and
 d. connecting said at least one friction belt drive with parallel pulleys between said module and said at least one slave transmission.

22. The method of claim 19, wherein said drive train comprises at least one slave transmission and at least one gearbox having at least one gearbox input shaft, and at least one gearbox output shaft nonparallel to said at least one gearbox input shaft, the method further comprising the steps of:
 a. linking said at least one input shaft or said at least one output shaft of said at least one test transmission to the corresponding shaft of said at least one slave transmission in a substantially parallel alignment by a connecting drive;
 b. turning said at least one slave gearbox to a position in which two shafts in said mechanical loop align parallel; and
 c. connecting said at least one friction belt drive with parallel pulleys between said two shafts.

23. A system for testing at least one test transmission comprising:
 a. at least one test transmission having at least one input shaft and at least one output shaft;
 b. a drive train closing a mechanical loop between said at least one input shaft to said at least one output shaft, said drive train comprising at least one friction belt drive with at least one belt, the overall gearing ratio of said drive train is less than the gearing ratio in said at least one transmission between said at least one input shaft to said at least one output shaft in said test transmission; and
 c. a turning device for rotating said mechanical loop,
 d. at least one torque producing device, wherein said torque producing device changes the tension of said at least one belt such that the operation of said mechanical loop turns from slippage to creepage in said at least one belt during rotation.

24. A method of running at least one test transmission having at least one input shaft and at least one output shaft, the method comprising the steps of:
 a. closing a mechanical loop between said at least one input shaft and said at least one output shaft by a drive train comprising at least one friction belt drive having at least one belt, wherein the gearing ratio of said at least one friction belt drive is set such that the overall gearing ratio of said drive train is less than the gearing ratio in said at least one transmission between said at least one input shaft to said at least one output shaft in said test transmission;
 b. rotating said mechanical loop by a turning device; and
 c. inducing torque in said mechanical loop by at least one torque producing device, wherein said torque producing device changes the tension of said at least one belt such that the operation of said mechanical loop turns from slippage to creepage during rotation.

* * * * *